(12) United States Patent
Janowski

(10) Patent No.: US 8,465,093 B2
(45) Date of Patent: Jun. 18, 2013

(54) VEHICLE SEAT COVERS WITH INTERCHANGEABLE PANELS

(75) Inventor: Joseph D. Janowski, Cresskill, NJ (US)

(73) Assignee: Automotive Innovations, Inc., Totowa, NJ (US)

( * ) Notice: Subject to any disclaimer, the term of this patent is extended or adjusted under 35 U.S.C. 154(b) by 0 days.

(21) Appl. No.: 13/306,476

(22) Filed: Nov. 29, 2011

(65) Prior Publication Data
US 2013/0093225 A1     Apr. 18, 2013

Related U.S. Application Data

(60) Provisional application No. 61/546,388, filed on Oct. 12, 2011.

(51) Int. Cl.
*A47C 31/02*     (2006.01)
*A47C 31/11*     (2006.01)
*A47C 7/74*      (2006.01)

(52) U.S. Cl.
USPC ............... 297/223; 297/228.1; 297/228.13; 297/229; 297/180.11

(58) Field of Classification Search
USPC ............ 297/228.13, 229, 180.11, 223, 224, 297/225, 226, 227, 228, 228.1, 228.11, 228.12
See application file for complete search history.

(56) References Cited

U.S. PATENT DOCUMENTS

| | | | | |
|---|---|---|---|---|
| 2,848,039 A | * | 8/1958 | Lenz | 297/224 |
| 4,047,756 A | * | 9/1977 | Ney | 297/228.13 X |
| 4,413,857 A | * | 11/1983 | Hayashi | 297/180.11 |
| 4,887,865 A | * | 12/1989 | Dawidzon | 297/229 X |
| 5,560,683 A | * | 10/1996 | Penley et al. | 297/228.13 X |
| 5,613,730 A | * | 3/1997 | Buie et al. | 297/180.11 X |
| 5,615,928 A | * | 4/1997 | Penley | 297/228.13 X |
| 5,690,380 A | | 11/1997 | Waters | |
| 5,690,384 A | * | 11/1997 | Rossi | 297/228.13 X |
| 5,758,924 A | * | 6/1998 | Vishey | 297/228.13 X |
| 5,775,778 A | | 7/1998 | Riley et al. | |
| 5,806,925 A | | 9/1998 | Hanley | |
| 5,820,214 A | * | 10/1998 | Bessette et al. | 297/228.13 |
| 6,073,998 A | * | 6/2000 | Siarkowski et al. | 297/180.11 X |
| 6,079,779 A | * | 6/2000 | Tanaka et al. | 297/228.13 |
| 6,079,784 A | | 6/2000 | Peachey | |
| 6,332,651 B1 | * | 12/2001 | Horisawa | 297/219.1 X |
| 6,409,264 B1 | | 6/2002 | Palmer et al. | |

(Continued)

FOREIGN PATENT DOCUMENTS

| | | |
|---|---|---|
| EP | 2075156 A2 | 7/2009 |
| JP | 2000-070078 A | 3/2000 |
| KR | 20-1998-004934 | 10/1998 |
| WO | WO-98-54025 A1 | 12/1998 |

OTHER PUBLICATIONS

Tactical-Life.com, website, http://www.tactical-life.com/online/tactical-weapons/vehicle-seat-covers/.
Seat Makers, website, http://matchmyjeep.com/.

(Continued)

*Primary Examiner* — Rodney B White
(74) *Attorney, Agent, or Firm* — Clegg, PC; Perry S. Clegg

(57) ABSTRACT

An automotive seat cover is provided which allows a person to change the appearance of the seat cover without removing the seat cover from the seat. The seat cover includes panels which are removably attachable to the seat cover to alter the functionality or the visual appearance of the seat cover.

23 Claims, 5 Drawing Sheets

U.S. PATENT DOCUMENTS

| | | | |
|---|---|---|---|
| 6,659,550 B2 * | 12/2003 | Hackett | 297/228.13 X |
| D508,360 S | 8/2005 | Inman | |
| 7,172,246 B1 * | 2/2007 | Itakura | 297/219.1 |
| D538,574 S | 3/2007 | Eskandry | |
| D539,067 S | 3/2007 | Dayan | |
| 7,390,059 B2 * | 6/2008 | Brockschnieder et al. | 297/228.13 |
| 7,488,036 B2 * | 2/2009 | Tache | 297/228.13 |
| 7,600,335 B2 | 10/2009 | Suprina | |
| D610,854 S | 3/2010 | Siklosi et al. | |
| D610,855 S | 3/2010 | Siklosi | |
| D611,751 S | 3/2010 | Siklosi | |
| 7,673,939 B2 * | 3/2010 | Taguchi et al. | 297/228.13 X |
| 7,681,345 B2 | 3/2010 | Suprina | |
| D621,194 S | 8/2010 | Chiang | |
| D634,151 S | 3/2011 | Pettit et al. | |
| 8,025,333 B2 * | 9/2011 | Yasuda | 297/228.13 |
| D663,153 S | 7/2012 | Kenkelen et al. | |
| 2007/0145797 A1 * | 6/2007 | Itakura | 297/228.1 |
| 2009/0160230 A1 * | 6/2009 | Yasuda | 297/228.13 |

OTHER PUBLICATIONS

ThrottleJockey, website, http://throttlejockey.com/product/x_cDN104DZpBnJzEY2IkPT/%2702-%2707%20CR%20125/250.

International Search Report and the Written Opinion of the International Searching Authority in related PCT Application No. US2011/063124.

* cited by examiner

VEHICLE SEAT COVERS WITH INTERCHANGEABLE PANELS

PRIORITY

The present application claims the benefit of U.S. Provisional Patent Application Ser. No. 61/546,388, filed Oct. 12, 2011, which is incorporated herein by reference in its entirety.

THE FIELD OF THE INVENTION

The present invention relates to automobile seat covers. More specifically, the present invention relates to automobile seat covers which have removable and replaceable panels which may be interchanged to alter the appearance and functionality of the seat.

BACKGROUND

A common customization for cars is the installation of aftermarket seat covers. Seat covers are commonly used to alter the appearance to the vehicle, such as by matching an aftermarket paint job or by matching other decorative items added to the vehicle. These seat covers do require time and care to produce a neat and attractive visual appearance. Additionally, there is considerable cost in replacing an entire seat cover to change the visual appearance of the seat cover. Thus, it is usually not feasible to temporarily remove and replace aftermarket seat covers in order change the visual appearance of the seat cover for a short period of time.

In many situations, however, people desire to temporarily alter the color or visual appearance of their vehicle seats. For example, people may desire to alter the appearance of their vehicle seats by temporarily adding a sports team's logo and colors on game day or adding a company's design or colors for a company event. It would thus increase the ability of car owners to customize their cars by having the option of quickly and effectively changing the visual appearance of installed car seats.

It is thus desirable to have an aftermarket seat cover system which allows a person to quickly and easily change the visual appearance of their car seats.

SUMMARY OF THE INVENTION

It is an object of the present invention to provide an improved automotive seat cover.

According to one aspect of the invention, an automotive seat cover is provided which allows for easily changing the appearance of the seat cover without removing the seat cover from the seat. Supplemental insert panels may be attached to the seat cover to change the color and appearance of the seat cover. These decorative insert panels may be replaced or interchanged to alter the color, pattern, etc. which is displayed on the seat cover. According to another aspect of the invention, functional insert panels may be interchanged in order to alter the function of the seat.

These and other aspects of the present invention are realized in an automotive seat cover as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIGURE, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
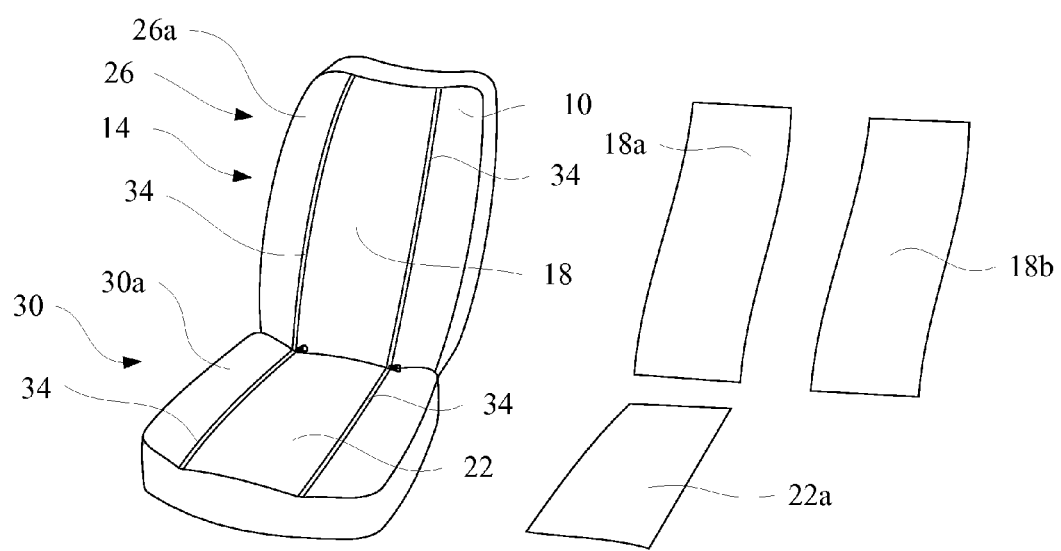
FIG. 1 shows a perspective view of an automotive seat cover system according to the present invention.

Turning now to FIG. 1, a perspective view of an automotive seat cover system according to the present invention is shown. The seat cover 10 is installed over an automotive seat 14. The seat cover 10 may be made of various different materials according to the particular style of the seat cover. Materials such as leather, vinyl, and cloth are commonly used.

The seat cover 10 includes an insert panel 18 which is removably attached to the seat cover. If desired, the seat cover may include a first insert panel 18 and a second insert panel 22. The insert panels 18, 22 are typically located along the center portion of the seat cover. The first insert panel 18 extends along the height of the seat back 26 and the second insert panel extends along the length of the seat bottom 30. For automotive seats 14 which include support bolsters 26a, 30a along the sides of the seat, the insert panels 18, 22 will often extend between the left and right side bolsters. In such a configuration, the insert panels may cover between about 30 and about 65 percent of the width of the seat. Commonly, the insert panels cover about 45 to 50 percent of the width of the seat and are located along the center of the seat.

Figure 2:
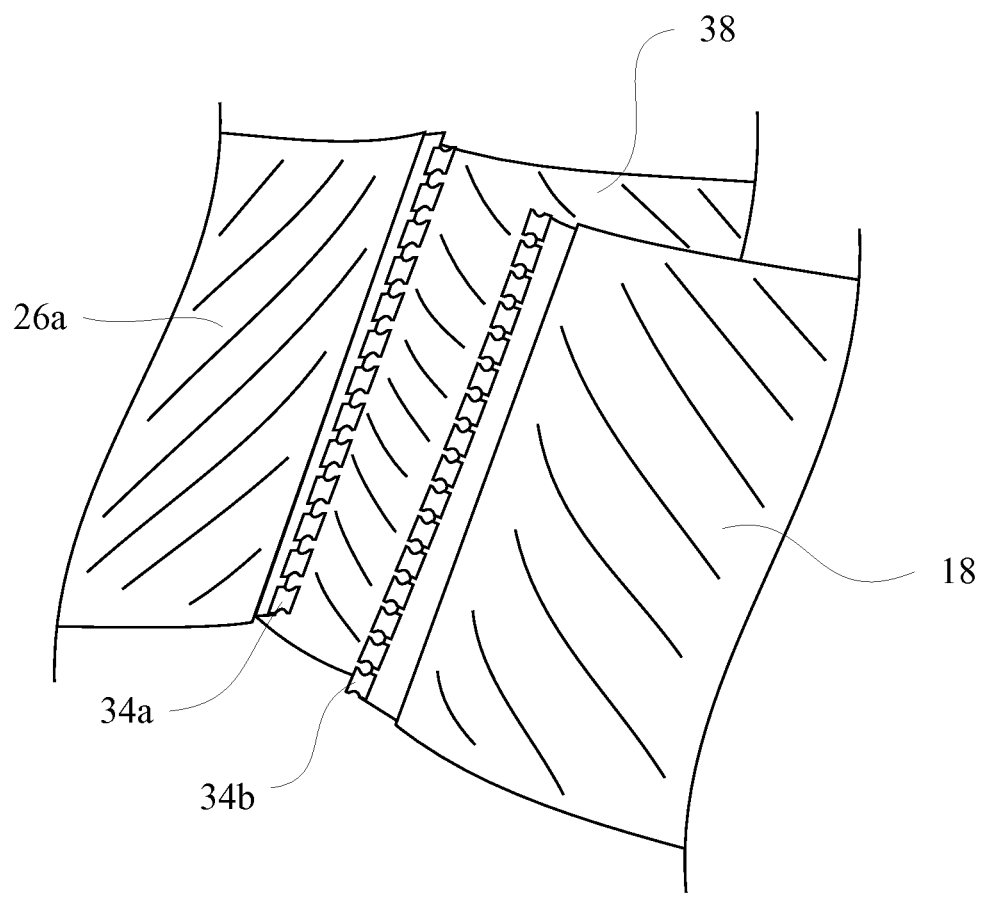
FIG. 2 shows a perspective view of a detail of the seat cover of FIG. 1.

The insert panels 18, 22 (as well as the additional insert panels 18a, 18b, 18c, 18d, 22a) are removably attached to the seat cover 10 by a temporary fastener. According to one aspect of the invention, the insert panels 18, 22 are attached to the seat cover 10 with a temporary fastener such as zippers 34. FIG. 2 shows a detailed view of the zipper attachment for the seat back portion of the seat cover 10. The other parts of the seat cover 10 are similarly formed. One track of the zipper 34a is sewn into the seat cover, often in the seam between the bolster panels 26a, 30a and the center panel 38 of the seat cover 10. The other track of the zipper 34b is sewn onto the edge of the insert panel 18. A corresponding zipper track is also sewn onto the appropriate edges of the additional insert panels 18a, 18b, 18c, 18d, 22a. Alternative temporary fasteners such as hook and loop fasteners or snaps may be used to attach the insert panels to the seat cover.

The insert panels may be decorative panels as well as functional panels. Thus, the insert panels 18, 22 are often made to be a different type of cloth or different texture, a different color or a decorative pattern as compared to the rest of the seat cover 10. Thus, for example, the seat cover 10 may be a black or grey fabric or vinyl while the insert panels 18, 22 are a brightly colored fabric, vinyl, leather, etc. The insert panels 18, 22 may be a color which is chosen to match or compliment other aftermarket parts which have been added to the vehicle. In such a situation, the seat cover 10 may be black while the insert panels 18, 22 are yellow. The insert panels 18, 22 may also be a pattern or graphic, such as a Hawaiian theme, flames, tribal striping, team or company logos, etc.

Figure 3:
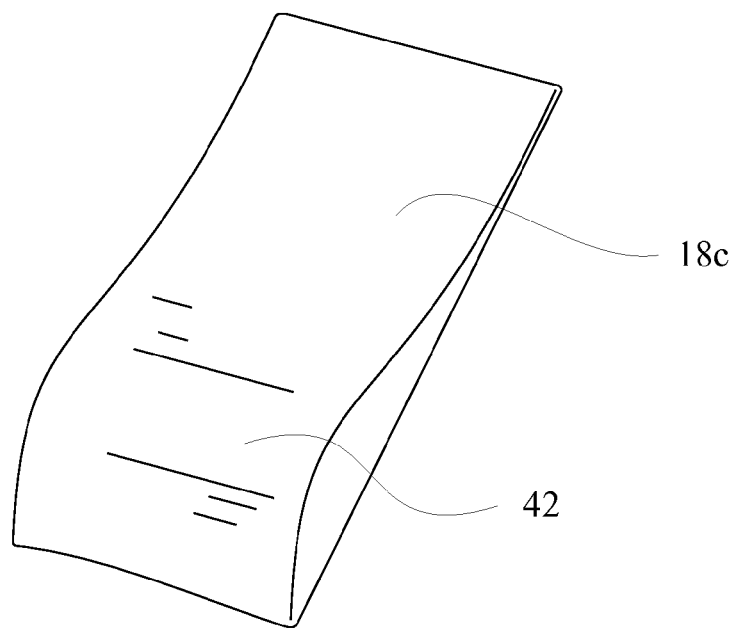
FIG. 3 shows a perspective view of an insert panel of the present invention.
Figure 4:
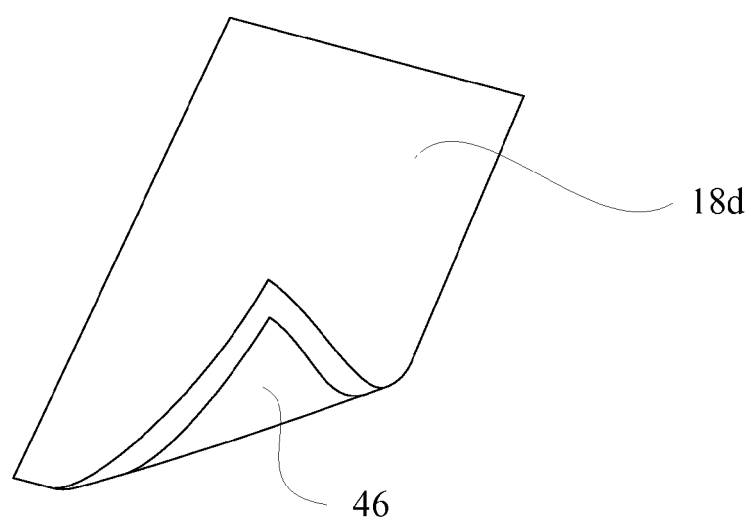
FIG. 4 shows another perspective view of an insert panel of the present invention.

Additionally, the decorative insert panels 18, 22 may provide functional modifications to the seat cover 10. FIG. 3, for example, shows an insert panel 18c which includes a padded portion 42 which provides additional lumbar support. A person who has installed the seat cover 10 onto their vehicle seat can install the insert panel 18c to customize the seat to be more comfortable. FIG. 4 shows an insert panel 18d which includes a seat heater 46. A person can install the insert panel 18d to add a seat heater to their automotive seats without the complex installation typically required to install aftermarket seat heaters. The functional insert panels 18c, 18d are also made available in different visual appearances (such as color and graphic pattern) as discussed with respect to the decorative insert panels 18, 18a, 18b, 22, 22b. Additionally, the functional insert panels 18c, 18d are installed and removed in the same manner.

The seat covers 10 are provided as part of a system where additional insert panels 18a, 18b, 18c, 18d, 22a are available for purchase. The additional insert panels 18a, 18b, 18c, 18d, 22a, are offered in a variety of different colors, patterns, etc. so that a person may purchase the insert panels which match their car, their favorite sports team, etc.

Typically, all of the seat cover 10 (including the center panels, bolster panels, sides, back, etc.) has the same general visual appearance (i.e. color, texture). Common colors for the seat cover 10 are white, grey, black, and tan. The seat covers 10 are often chosen to be colors which complement the carpet and interior of the vehicle. The insert panels 18, 22 are typically chosen by a person to match items such as aftermarket shifters, lighting, or trim, sports teams, etc. The insert panels may commonly be bright colors, vinyl with carbon fiber appearance, sports logos, and graphic designs. The zippers 34 may be selected to minimize their visibility against the seat cover or alternatively to stand out from the seat cover. For example, the zippers may be black plastic in order to blend in with a black seat cover. Alternatively, the zippers may be a bright color such as yellow in order to highlight and accent an insert panel such as a carbon fiber appearance vinyl.

An insert panel 18, 22 is installed onto the seat cover 10 by placing the insert panel in the appropriate location on the seat cover, engaging the two halves of the zippers 34, and securing the zippers. When a person wants to change the insert panels 18, 22, they may obtain a different insert panel, remove the insert panel which is currently attached to the seat cover 10, and attach the different insert panel to the seat cover. This is easily performed without removal of the seat cover 10. This allows a person to change the appearance of the seats very easily. A person may change the insert panels in minutes, allowing them to change the insert panels for a single event if desired. Additionally, the present invention avoids undue wear and tear on the seat covers 10 and seats 14 as removal and installation of the seat covers is a more invasive process. The removable insert panels 18, 22 also allow a person to customize the appearance of their vehicle much more inexpensively, as the insert panels may be purchased for considerably less than a new set of seat covers.

The portions of the seat cover 10 which are covered by the insert panels 18, 22 are preferably filled with the same material as the seat cover is made from. This provides versatility in removing the insert panels if desired. This also typically provides the most structural integrity for the seat cover. If desired, however, the part of the seat cover which will be covered by the interchangeable panel may be empty or just contain minimal material to hold the seat cover together when an insert panel is not installed.

Figure 5:
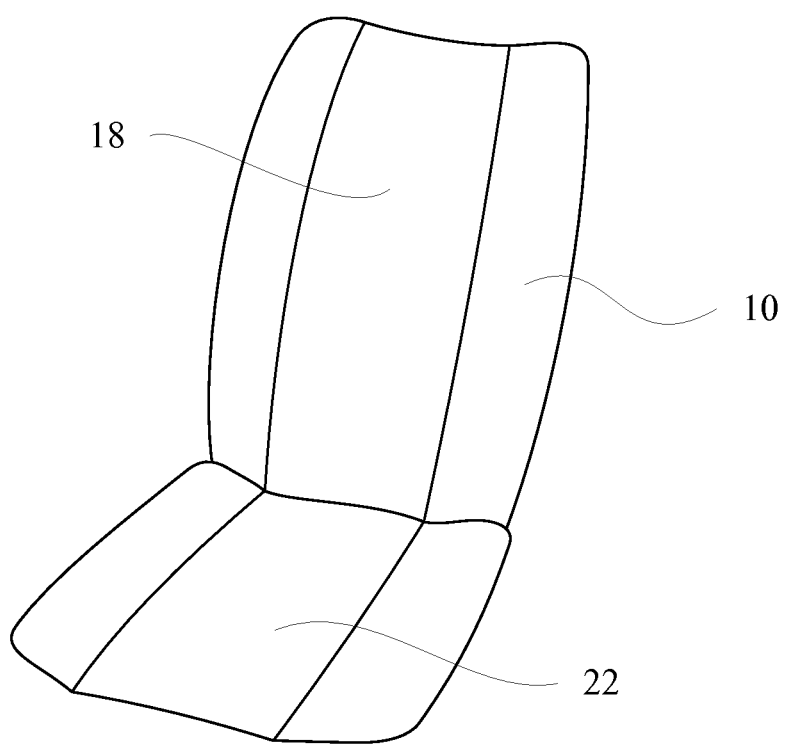
FIG. 5 shows another perspective view of the seat cover of FIG. 1.

FIG. 5 shows a seat cover 10 which is not installed on a seat. It can be seen how the seat cover is compliant and does not rigidly hold a shape. This allows the seat cover to conform better to a seat and provides a better finished appearance.

Figure 6:
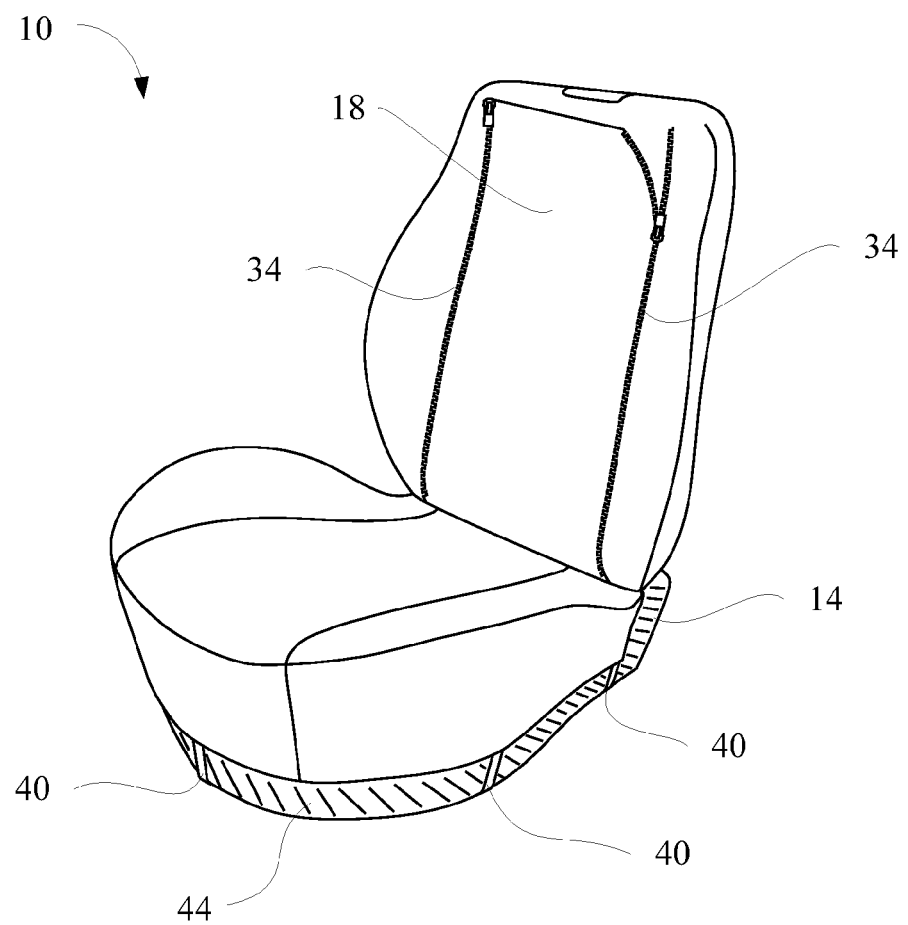
FIG. 6 shows a perspective view of an automobile seat cover system according to the present invention.

FIG. 6 shows an automobile seat cover 10 which is installed on a seat 14 in accordance with the present invention. As shown in FIG. 6, the seat cover may be selectively attachable and selectively removable using straps 40 for securing and detaching the seat cover 10 to and from the automobile seat 14. As can be seen from FIG. 6, the seat cover 10 may be installed over the existing fabric 44 of the seat 14 and may be used to hide damage to the existing seat fabric 44 (e.g., rips or stains). It should be appreciated that various means for selectively attaching and removing the seat cover 10 to and from a seat 14 are available in the art and could be used in place of securing straps 40.

The present invention provides several benefits. The present invention allows a person to easily and inexpensively modify the appearance and functionality of their car seats. The invention is also advantageous for retailers. As the retailers will stock fewer automotive seat covers (which take more shelf space) and more insert panels (which take much less shelf space), the retailers can achieve a significant reduction in the required shelf space to sell the seat cover system while providing a greater variety of color and performance options to the consumer.

There is thus disclosed an improved seat cover with removable insert panels. It will be appreciated that numerous changes may be made to the present invention without departing from the scope of the claims.

What is claimed is:

1. An automotive seat cover system for covering a vehicle seat having an existing covering, the seat cover system comprising:

a removably attachable seat cover selectively attachable to a vehicle seat to cover an existing fabric of the vehicle seat, the removably attachable seat cover having an inner facing seat cover surface and an outer facing seat cover surface, wherein the inner facing seat cover surface is configured to face the vehicle seat and the outer facing seat cover surface is configured to face away from the vehicle seat;

a first section of the removably attachable seat cover substantially defined by a first temporary fastener attached to an inner surface area of the outer facing seat cover surface, the first section being a center panel;

a first insert panel having a perimeter with a shape corresponding to the first section of the removably attachable seat cover;

a second temporary fastener disposed substantially around the perimeter of the first insert panel; and wherein the first temporary fastener and the second temporary fastener are attachable to each other to thereby removably attach the first insert panel to the first section of the removably attachable seat cover and cover the center panel of the removably attachable seat cover.

2. The seat cover system of claim 1, wherein the first insert panel has a visual appearance which is different than a visual appearance of the removably attachable seat cover.

3. The seat cover system of claim 1, wherein the first insert panel is a different color than the color of the removably attachable seat cover.

4. The seat cover system of claim 1, wherein the first insert panel has a graphic design which is different than the removably attachable seat cover.

5. The seat cover system of claim 1, wherein the first temporary fastener and the second temporary fastener are zipper tracks.

6. The seat cover system of claim 1, wherein the first temporary fastener and the second temporary fastener are hook and loop fastener elements.

7. The seat cover system of claim 1, wherein the removably attachable seat cover is selectively attachable to a seat back section of the vehicle seat and wherein the center panel of the removably attachable seat cover is positioned on the inner surface area of the outer facing seat cover surface that is selectively attachable to the seat back section of the vehicle seat.

8. The seat cover system of claim 7, further comprising:
a second section of the removably attachable seat cover substantially defined by a third temporary fastener attached to an inner surface area of the outer facing seat cover surface that is selectively attachable to the seat bottom section of the vehicle seat, the second section being a second center panel;
a second insert panel having a perimeter with a shape corresponding to the second section of the removably attachable seat cover; a fourth temporary fastener disposed substantially around the perimeter of the second insert panel; and
wherein the third temporary fastener and the fourth temporary fastener are attachable to each other to thereby removably attach the second insert panel to the second section of the removably attachable seat cover and cover the second center panel of the removably attachable seat cover.

9. The seat cover system of claim 1, wherein the removably attachable seat cover is selectively attachable to a seat bottom section of the vehicle seat and wherein the center panel of the removably attachable seat cover is positioned on the inner surface area of the outer facing seat cover surface that is selectively attachable to the seat bottom section of the vehicle seat.

10. A seat cover system comprising:
a removably attachable seat cover selectively attachable to a seat to cover a seat surface defined by an existing fabric of the seat;
a first temporary fastener disposed on the removably attachable seat cover;
a first section of the removably attachable seat cover substantially defined by the first temporary fastener, the first section being a center panel;
a first insert panel having a perimeter with a shape which corresponds to the shape of the first section;
a second temporary fastener disposed substantially around the insert panel; and
wherein the first temporary fastener and the second temporary fastener are attachable together to removably attach the first insert panel to the seat cover so that the first insert panel covers the first section of the seat cover and covers the center panel of the removably attachable seat cover.

11. The seat cover system of claim 10, wherein the first temporary fastener and the second temporary fastener are zipper tracks.

12. The seat cover system of claim 10, wherein the first temporary fastener and the second temporary fastener are hook and loop fastener elements.

13. The seat cover system of claim 10, wherein the first insert panel has a visual appearance which is different than a visual appearance of the removably attachable seat cover.

14. The seat cover system of claim 10, wherein the first panel has a visual appearance which is different than a visual appearance of the first section center panel of the removably attachable seat cover.

15. The seat cover system of claim 10, wherein the first insert panel has a non-uniform padding so as to change the contour of the seat on which the removably attachable seat cover and insert panel are installed.

16. The seat cover system of claim 10, wherein the first insert panel further comprises a seat heater.

17. The seat cover system of claim 10, wherein the center panel comprises between about 30 percent and about 65 percent of a seating surface of the removably attachable seat cover.

18. The seat cover system of claim 10, wherein the center panel extends along the center of a seating surface of the removably attachable seat cover.

19. The seat cover system of claim 18, wherein the center panel comprises approximately one half of a width of the seating surface.

20. A method of temporarily altering the appearance of a vehicle seat comprising:
selecting a vehicle seat having a seating surface defined by an existing fabric covering the seat;
selecting a removably attachable seat cover having a seating area which covers the seating surface of the vehicle seat and having a first temporary fastener disposed on the seating area so as to define a first section of the seat cover, the first section being a center panel;
removably attaching the seat cover to the vehicle seat such that the seating area of the removably attachable seat cover covers the seating surface of the seat;
selecting a first insert panel, the first insert panel having a second temporary fastener attached thereto; and attaching the first temporary fastener to the second temporary fastener to thereby removably attach the first insert panel to the removably attachable seat cover and cover the center panel of the removably attachable seat cover.

21. The method of claim 20, wherein the method comprises selecting a first insert panel which has a visual appearance which is different than a visual appearance of the removably attachable seat cover.

22. The method of claim 20, wherein the method comprises selecting a first insert panel which is a different color than the removably attachable seat cover.

23. The method of claim 20, wherein the first temporary fastener and the second temporary fastener are selected from a group consisting of zipper tracks, hook and loop fastener elements, and snaps.

* * * * *